April 10, 1928.
R. H. RIDGEWAY
TIE HOLDER
Filed Sept. 30, 1927
1,665,477
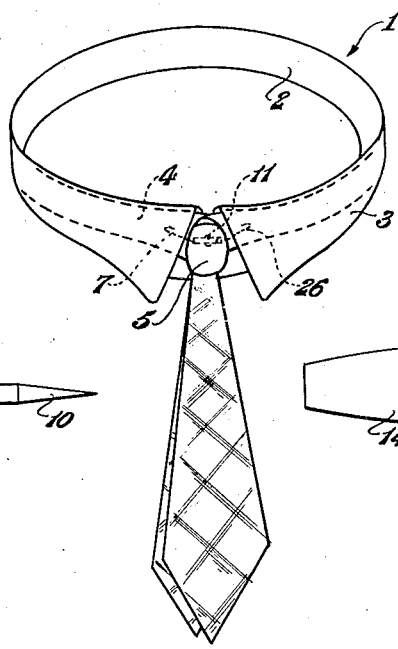
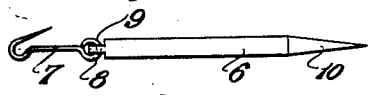
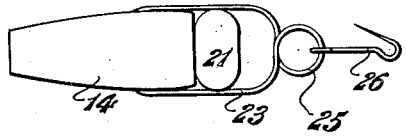
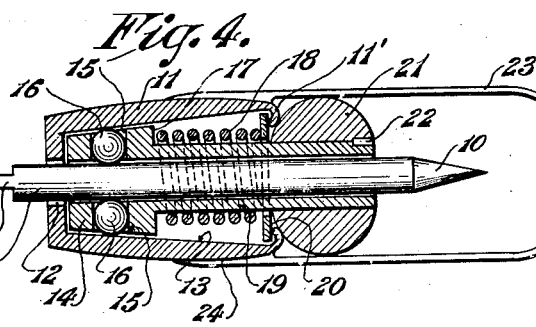
INVENTOR,
Ralph H. Ridgeway,
BY
Harry W. Bowin.
ATTORNEY.

Patented Apr. 10, 1928.

1,665,477

UNITED STATES PATENT OFFICE.

RALPH H. RIDGEWAY, OF SPRINGFIELD, MASSACHUSETTS.

TIE HOLDER.

Application filed September 30, 1927. Serial No. 223,072.

This invention relates to improvements in tie holders, for the purpose of normally retaining a four-in-hand necktie in the upper folded portion of the collar, in order to prevent the tie from slipping downward. It is particularly designed for use with soft and semisoft collars as well as stiff collars. At present it is necessary to draw a four-in-hand tie very tightly around the inner band of the collar in order to cause it to remain in place. This not only materially injures the tie, but is often very uncomfortable for the wearer. When the tie slips downward it is more or less unsightly in appearance.

This invention, broadly considered, comprises two sharp hooks which are oppositely located with relation to each other. These hooks are designed for insertion in the band part of the tie and on opposite sides of the knot or bow part of a four-in-hand. The central part of the tie holder is located and concealed behind the bow part. It consists of a removable clutch pin to which one of the hooks is attached, a spring actuated plunger member having a ball, or balls, which automatically engage the pin, a tubular part connected to the plunger in which the clutch pin is located, a cone-shaped cup, to which the other hook is attached, as will be fully described and specifically set out in the claims, and statement of operation.

Referring to the drawings:

Fig. 1 is a perspective view showing the device attached to a four-in-hand tie and located back of the bow part of the tie where it is concealed from view.

Fig. 2 is a detailed view of the removable and locking or clutch pin.

Fig. 3 shows the main part of the holder separated from the locking pin, and,

Fig. 4 is an enlarged sectional view through the axis of the pin.

Referring to the drawings in detail:

1 designates a turn over collar as a whole having the usual inner and outer folds 2 and 3. The band part or portion of the tie indicated at 4 is located between the folds 2 and 3. The bow part on the tie is indicated at 5. 6 designates the clutch or locking pin of the holder, to one end of which is attached the sharp band engaging hook by means of the eye 8 which is passed through an opening in the reduced extension 9. The opposite end 10 of the pin 6 is pointed for insertion between the clutch balls. 11 designates a cup shaped member which is formed with an opening 12 through which passes the clutch pin 6. The inner surface of this member 11, is inclined or tapered, as shown. 14 designates the slidable plunger having a tapered side which corresponds with the inclined sides 13 of the member 11. This plunger is formed with openings 15 for receiving the locking balls 16 which engage the clutch pin 6. The plunger 14 is formed with a shoulder portion 17, against one end of the coiled spring 18. This coiled spring is located around the integral tubular extension 19. Loosely mounted on the tubular extension 19 is the washer 20 against which the opposite end of the coiled spring 18 bears. Secured to the tubular extension 19 is a knob or ball member 21 which the operator grasps with his thumb and finger for drawing the plunger 14 outward against the tension of the spring 18, when the pin 6 is to be removed. The knob or ball 21 is fixedly secured to the tubular extension 19 by means of the pin 22 or by any other suitable means. 23 is a bail wire that is secured at its ends to the member 11 as indicated at the point 24 by means of solder or other suitable means. The outer end of the wire 23 is formed with a ring or loop 25, and, located in this loop is the sharp hook 26.

This device may be termed as an invisible tie holder as the main part of the holder is located directly back of the knot of the tie as shown in Fig. 1.

In use the hook 26 is first inserted in the band 4, next the hook 7 is inserted in the band 4 on the other side of the knot 5, and the clutch pin 6 passed through the tubular member 19 and is moved into position to firmly draw the band 4 against the inner side of the inner fold of the collar. The operator then releases his hold on the part 21 which permits the spring 18 to move the plunger 14 downward in the cone-shaped part 11. This causes the balls 16 to be forced against the clutch pin 6, whereby the band 4 is firmly retained in place. In order to remove the holder it is only necessary to pull outward on the ball 21 which releases the pressure of the ball 16. It is to be understood that I do not limit myself to the use of any particular number of locking balls 16 as two or three may be used, or even a single ball is operative to secure the clutch pin 6 in its adjusted positions.

From this description it will be seen that

I have provided a very efficient tie holder and one that is invisible when in use and can be readily attached to and removed from the band part of the tie. The part 11' is bent over to retain the washer 20 in place.

What I claim is:

1. In combination, a member which is formed with an inclined inner surface and having an opening at one end, a spring actuated plunger member within said member formed with recesses to receive spherical balls, a reduced tubular portion on the plunger member to provide a shoulder part, a spring bearing against the shoulder part at one end, a washer loosely mounted on the reduced tubular extension and against which the other end of the spring bears, a knob located on the tubular member for operating the plunger, a clutch pin located in the tubular member and in the opening of the first mentioned member, a plurality of clutch devices in the plunger member, and movably against the clutch pin by action of the spring, a tie engaging hook attached to the clutch pin member and a hook attached to the first mentioned member.

2. In combination, in a tie holder for the purpose described, a cone-shaped member having an inclined inner surface and formed with a pin receiving opening, a tapered plug in said member which is formed with a reduced tubular part, a washer loosely mounted on said part, a spring located on the tubular part and between the washer and the said plug, a knob secured to the tubular part for operating the plug, a clutch pin in the plug and plunger, a coil attached to the cone-shaped member, a hook attached to the clutch pin and bail respectively, a ball loosely mounted in the tapered plug which contacts with the said inclined surface and clutch pin, whereby the spring will operate to force the balls against the clutch pin when the knob is released, and whereby the two tie band hooks may be adjusted relative to each other.

RALPH H. RIDGEWAY.